US012382931B2

(12) United States Patent
Broers et al.

(10) Patent No.: US 12,382,931 B2
(45) Date of Patent: Aug. 12, 2025

(54) SYSTEM AND METHOD FOR SUPPLYING SUSTENANCE TO AN ANIMAL SPECIES

(71) Applicant: SIGNIFY HOLDING B.V., Eindhoven (NL)

(72) Inventors: Harry Broers, 's-Hertogenbosch (NL); Marc Andre De Samber, Lommel (BE); Aaron Benjamin Stephan, Chanhassen, MN (US); Fetze Pijlman, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/283,038

(22) PCT Filed: Mar. 10, 2022

(86) PCT No.: PCT/EP2022/056203
§ 371 (c)(1),
(2) Date: Sep. 20, 2023

(87) PCT Pub. No.: WO2022/200062
PCT Pub. Date: Sep. 29, 2022

(65) Prior Publication Data
US 2025/0072400 A1    Mar. 6, 2025

Related U.S. Application Data

(60) Provisional application No. 63/164,637, filed on Mar. 23, 2021.

(30) Foreign Application Priority Data

Mar. 30, 2021  (EP) .................................... 21166001

(51) Int. Cl.
*A01K 29/00* (2006.01)
*H05B 47/115* (2020.01)
*A01K 39/04* (2006.01)

(52) U.S. Cl.
CPC .......... *A01K 29/005* (2013.01); *H05B 47/115* (2020.01); *A01K 39/04* (2013.01)

(58) Field of Classification Search
CPC ...... A01K 29/005; A01K 39/04; A01K 29/00; A01K 39/00; H05B 47/115
(Continued)

(56) References Cited

U.S. PATENT DOCUMENTS 8,915,215 B1 * 12/2014 Helgeson ............... A01K 45/00
    119/421
9,807,981 B2 * 11/2017 Berckmans ............. A01K 5/02
(Continued)

FOREIGN PATENT DOCUMENTS

WO    2018175561 A1    9/2018
WO    2019202127 A1    10/2019
(Continued)

*Primary Examiner* — Ryan Jager

(57) ABSTRACT

A system (100) for supplying sustenance to animals is provided, comprising a sustenance unit (110), a light source (120) configured to illuminate the sustenance unit, and a sensor arrangement (130) configured to detect a movement of the sustenance unit, a position of an animal in proximity to the sustenance unit, a motion of an animal in proximity to the sustenance unit, and a sound of an animal in proximity to the sustenance unit. The system further comprises a processor configured to compare the detected motion with a predetermined motion associated with an activity of the animal, and to determine an activity of the animal based on the detected position, motion and/or sound of the animal. The system is configured to, via the processor, control the
(Continued)

light source based on the detected movement of the sustenance unit and/or the determined activity of the animal.

15 Claims, 5 Drawing Sheets

(58) Field of Classification Search
USPC .......................................................... 315/291
See application file for complete search history.

(56) References Cited

U.S. PATENT DOCUMENTS

| | | | |
|---|---|---|---|
| 10,080,343 B1* | 9/2018 | Chu | A01K 5/0114 |
| 12,010,976 B2* | 6/2024 | Herborn | A01K 31/18 |
| 2016/0305622 A1 | 10/2016 | Baker, Jr. | |
| 2017/0000163 A1 | 1/2017 | Grajcar | |
| 2017/0290124 A1 | 10/2017 | Grajcar | |
| 2018/0092331 A1 | 4/2018 | Zuidhof et al. | |
| 2020/0037583 A1* | 2/2020 | Grajcar | A01K 31/22 |
| 2020/0196568 A1 | 6/2020 | Robertson et al. | |
| 2021/0162162 A1* | 6/2021 | Leirs | H05B 45/10 |
| 2022/0125021 A1* | 4/2022 | Herborn | G10L 25/63 |
| 2025/0072400 A1* | 3/2025 | Broers | A01K 29/005 |

FOREIGN PATENT DOCUMENTS

| | | | |
|---|---|---|---|
| WO | 2020025320 A1 | 2/2020 | |
| WO | 2020165587 A1 | 8/2020 | |

* cited by examiner

SYSTEM AND METHOD FOR SUPPLYING SUSTENANCE TO AN ANIMAL SPECIES

CROSS-REFERENCE TO PRIOR APPLICATIONS

This application is the U.S. National Phase application under 35 U.S.C. § 371 of International Application No. PCT/EP2022/056203, filed on Mar. 10, 2022, which claims the benefit of European Patent Application No. 21166001.4, filed on Mar. 30, 2021, and U.S. Provisional Application Ser. No. 63/164,637, filed on Mar. 23, 2021. These applications are hereby incorporated by reference herein.

FIELD OF THE INVENTION

The present invention generally relates to supplying sustenance to an animal species. More specifically, the present invention relates to systems and methods for influencing an animal species sustenance intake behavior.

BACKGROUND OF THE INVENTION

Today, agriculture in modern communities has evolved into a field with industrial-like solutions, what years ago were simple chicken coops have transformed into industrial stables, such as large broiler stables, with thousands or more animals. The use of industrial methods and highly populated stables have increased the importance of monitoring and controlling of the animals in the stables.

There is a general need to increase the productivity and improve the wellbeing of animals being bred. Namely, there is a need to improve the monitoring and feeding of the animals. For example, in the field of chicken breeding, the monitoring and control of feeding and watering is important. It should be noted that the feeding and drinking behavior of the animals may provide much information. This information can be used as a metric for monitoring and controlling growth, for monitoring the health and wellbeing of the animals, and for managing the animals in general.

Thus, it is important to monitor the feeding and watering stations at which animals gather to intake sustenance. Due to the sometime dense animal populations in the stables, observing and analyzing the behavior of the animals is a relatively complicated matter.

There are numerous problems related to monitoring and influencing the animals' feeding and drinking behavior. One particular problem is the difficulty for a person, e.g. a farmer, to monitor the animals' behavior, as well as the state of the feeding and watering stations, and identify possible issues related hereto. The problems may be related to overcrowding at the feeding or water station, empty feeding and/or watering stations, dysfunctional stations etc. Furthermore, it is difficult for a farmer to influence the animals' behavior based on information received when monitoring the animals.

WO2018/175561A discloses a system that provides light sources in various areas of an animal enclosure to encourage or discourage animal behaviors. Different wavelengths or intensities of light are provided in various areas of the enclosure such that the animals in the enclosure are encouraged to occupy or not occupy the various areas. Lighting schedules for individual areas can be off-set from one another to encourage movement of the animals to different levels and preventing grouping or piling of the animals from occurring. The lighting schedules can be such that desirable or undesirable wavelengths or intensities of light, as perceived by the animals, are provided to different areas or levels at random times and for random durations during a day.

WO2020/165587A discloses an apparatus for rearing livestock comprising a livestock enclosure, a plurality of sensors and a plurality of output devices. Measurements are being performed to determine animal welfare by processing vocalizations produced by chicks, especially by detecting the spectral entropy of animal vocalizations to determine whether the animals suffer from stress. Based on the measurements, the output devices control environmental parameters within the animal enclosure, for example lighting levels, sounds or temperature.

Hence, there is a need for automated systems and methods to monitor the animals, and based on the information received from the monitoring, influence the behavior of the animals, in order to improve the sustenance intake behavior of the animals. Consequently, this will lead to improved wellbeing and growth of the animals.

SUMMARY OF THE INVENTION

It is an object of the present invention to provide a system and method which may provide monitoring of an animal species, and influencing the behavior of the animal species using a light source based on the information received when monitoring the animal species, to improve the sustenance intake of at least one animal of the animal species.

This and other objects are achieved by providing a system and a method having the features in the independent claim. Preferred embodiments are defined in the dependent claims.

Hence, according to a first aspect of the present invention, there is provided a system for supplying sustenance to animals. The system comprises at least one sustenance unit arranged to contain animal sustenance, at least one light source configured to illuminate the at least one sustenance unit and at least one sensor arrangement. The sensor arrangement is configured to detect a movement of the at least one sustenance unit, and to detect at least one of a position of at least one animal in proximity to the at least one sustenance unit, a motion of at least one animal in proximity to the at least one sustenance unit, and a sound of at least one animal in proximity to the at least one sustenance unit. The system further comprises a processor coupled to the at least one sensor arrangement, wherein the processor is configured to compare the detected motion with at least one predetermined motion associated with at least one activity of the at least one animal, determine at least one activity of the at least one animal based on at least one of the detected position of the at least one animal in proximity to the at least one sustenance unit, the comparison of the detected motion with the at least one predetermined motion and the detected sound of the at least one animal in proximity to the at least one sustenance unit. The system is configured to, via the processor, control the at least one light source based on the detected movement of the at least one sustenance unit and the determined at least one activity of the at least one animal.

According to a second aspect of the present invention, there is provided a method for supplying sustenance to animals. The method comprises the step of detecting a movement of at least one sustenance unit, and detecting at least one of a position of at least one animal in proximity to the at least one sustenance unit, a motion of at least one animal in proximity to the at least one sustenance unit, and a sound of at least one animal in proximity to the at least one sustenance unit. The method further comprises the step of comparing the detected motion with at least one predetermined motion associated with at least one activity of the at least one animal. The method further comprises the step of determining at least one activity of the at least one animal based on at least one of the detected position of the at least one animal, the comparison of the detected motion with the at least one predetermined motion, and the detected sound of the at least one animal. The method further comprises the step of controlling at least one light source configured to illuminate the at least one sustenance unit based on the detected movement of the at least one sustenance unit and the determined at least one activity of the at least one animal.

Thus, the present invention is based on the idea of monitoring an animal species and one or more sustenance units for the animal species. Based on information received during this monitoring, the system is configured to control one or more light sources in order to improve the sustenance intake behavior of the animal species by influencing the animal species with light emitted by the light source(s) for illuminating the sustenance unit(s). The monitoring in the present invention is performed by one or more sensor arrangements, which may detect position, motion and/or sound of animal(s) in proximity to the sustenance unit(s), as well as movement(s) of the sustenance unit(s). The present invention further provides analysis of any detected position, motion and/or sound of the animal(s) to determine one or more activities of the animal(s). Thereafter, the present invention controls the light source(s), based on the detected movement of the at least one sustenance unit and/or the determined activity of the at least one animal, to influence the behavior of the animal species.

The present invention is advantageous in that the system is able to, in an automated manner, monitor and control the sustenance intake of an animal species by controlling one or more light sources which illuminate the at least one sustenance unit based on detected data, in order to improve the growth and the wellbeing of the animal species. Hence, even in a densely populated stable, the growth and wellbeing of an animal species may be improved, by automated monitoring and analysis of the behavior of the animal species and by controlling the illumination of the sustenance unit(s) via the light source(s).

The present invention is further advantageous in that it may deter animals from overcrowding the sustenance unit(s). This may be achieved by controlling the at least one light source to deter at least one animal from going to (a) certain sustenance unit(s), and/or by controlling the at least one light source to encourage at least one animal to intake sustenance at (a) certain sustenance unit(s). By the term "overcrowding" it is here meant, but not limited to, a situation where the number of animals at a sustenance unit is too large for the supply sustenance to all the animals, and/or if a sustenance unit has significantly more animals in its proximity compared to other sustenance units.

The present invention is further advantageous in that it may provide a more uniform distribution of the animal species at the at least one sustenance unit, thus encouraging a more uniform sustenance intake rate at the sustenance unit(s). Consequently, a more uniform sustenance intake rate of the animal(s) may simplify the supply of sustenance to a plurality of sustenance units. Furthermore, the system may influence the duration of the sustenance intake of the animal(s).

The system of the present invention may detect sustenance units which are empty, or not functioning properly, based on the detected motion, position and/or sound of the animal species and the detected movement of the at least one sustenance unit. The present invention is therefore further advantageous in that the supply of sustenance for the animal species become more consistent and reliable. Consequently, this may lead to improved growth and wellbeing of the animal species.

The system for supplying sustenance to animals comprises at least one sustenance unit arranged to contain animal sustenance. The sustenance unit may be any type of feeder unit and/or water unit which allows animals to intake food and/or water. For example, the sustenance unit may be a unit comprising both means for feeding and watering animals. By the term "sustenance" it is here meant, but not limited to, any type of food or liquid, typically animal feed and water. The system further comprises at least one light source configured to illuminate the at least one sustenance unit. The light source may be substantially any type of light source which emits light that the animals may perceive. For example, the light source may be a light-emitting diode, LED, light source. The system further comprises at least one sensor arrangement. The sensor arrangement may comprise one or more sensors. The sensor arrangement may be powered by a battery. The sensor arrangement is configured to detect at least one of a movement of the at least one sustenance unit, a position of at least one animal in proximity to the at least one sustenance unit, a motion of at least one animal in proximity to the at least one sustenance unit and a sound of the at least one animal in proximity to the at least one sustenance unit. Hence, the sensor arrangement is configured to detect one or more of a movement of the sustenance unit(s) and a position, motion and sound of (an) animal(s) in proximity to the sustenance unit(s). By "proximity", it is here meant that the distance between the at least one animal and the at least one sustenance unit is below a (predetermined) threshold value. For example, the sensor arrangement may be configured to detect at least one animal position in relation to at least one sustenance unit, e.g. the distance between at least one animal and the at least one sustenance unit, and be configured to determine that the animal(s) is (are) in proximity (or alternatively, not in proximity) to the sustenance unit(s). The sensor arrangement may also detect movement, such as pecking, at the at least one sustenance unit.

The system further comprises a processor coupled to the at least one sensor arrangement. The processor is configured to compare the detected motion with at least one predetermined motion associated with at least one activity of the at least one animal. By the wording "predetermined motion associated with at least one activity" it is here meant substantially any motion, such as e.g. walking, running, pecking, standing still, etc. including the time lapse of such motion, which may be related to substantially any activity, such as e.g. moving, eating, sleeping, etc. The predetermined motion may be set, determined and/or stored in advance, e.g. by the system. For example, the system may be configured to compare a detected motion with a predetermined motion associated with at least one activity of the at least one animal, or detect a movement by the at least one sustenance unit, based on image frame(s) via image analysis, e.g. comprising pattern recognition.

The system may further be configured to determine a likelihood of at least one activity associated with at least one movement of the at least one sustenance unit, a motion of the at least one animal, a position of the at least one animal and/or a sound of the at least one animal, based on the detected position of the at least one animal, the comparison of the detected motion with the at least one predetermined motion and the detected sound of the at least one animal. Hence, the system may be configured to determine the likelihood, probability and/or plausibility of one or more activities associated and/or related with the position of the at least one animal, the comparison of the detected motion with the at least one predetermined motion and/or the sound of the at least one animal.

For example, the system may be configured to determine an activity by determining the most probable activity, based on the detected position of the at least one animal, the comparison of the detected motion with the at least one predetermined motion and the detected sound of the at least one animal, and choose/select the most probable activity. Further, the system may be configured to control the at least one light source based on the detected movement of the at least one sustenance unit and/or the most probable activity determined by the system, via the processor.

The processor is further configured to determine at least one activity of the at least one animal based on at least one of the detected position of the at least one animal, the comparison of the detected motion with the at least one predetermined motion, and the detected sound of the at least one animal. Hence, the processor is configured to determine one or more activities of the animal(s) based on the detected position of the animal(s), the comparison of the detected motion with the at least one predetermined motion and/or the detected sound of the animal(s).

The system is further configured to, via the processor, control the at least one light source based on at least one of the detected movement of the at least one sustenance unit and the determined at least one activity of the at least one animal. Hence, the system is further configured to, via the processor, control the light source(s) based on the detected movement of the sustenance unit(s) and/or the determined activity(ies) of the animal(s).

According to an embodiment of the present invention, the at least one sensor arrangement is configured to detect a movement of the at least one sustenance unit and a motion of at least one animal, and wherein the system is configured to, via the processor, control the at least one light source based on the detected movement of the at least one sustenance unit and the determined at least one activity of the at least one animal. Hence, the system may control the at least one light source, based on both the movement of the at least one sustenance unit and the determined activity(ies) of the at least one animal. The present embodiment is advantageous in that the system may more accurately determine an activity of the at least one animal. Therefore, the controlling of the at least one light source may be controlled based on more information, thus allowing improved influencing of the behavior of the animal species.

According to an embodiment of the present invention, the at least one sensor arrangement is integrated in the at least one sustenance unit. The present embodiment is advantageous in that the system may be more compact. Furthermore, the present embodiment is advantageous in that the at least one sensor arrangement facilitates an improved detection of both the movement of the sustenance unit, and the motion of the animal species in close proximity to the at least one sustenance unit. Thereby, the system is able to provide an even more accurate estimation of the behavior of the animal species.

According to an embodiment of the present invention, the at least one sensor arrangement comprises at least one of a camera, an accelerometer, a gyroscope, a weight sensor, a touch sensor, a radar, a lidar sensor, a capacitive sensor, an inductive sensor, a temperature sensor, a thermopile sensor and an audio sensor. Hence, the at least one sensor arrangement may detect any movement of the at least one sustenance unit, and/or a motion, position and/or sound of at least one animal using one or more of the devices as exemplified. The camera may be any (camera) sensor which detects visible light, infrared light and/or UV light. Furthermore, other sensors such as a gas sensor, an optical range sensor, an ammonia sensor and a time-of-flight sensor may be used to these ends.

According to an embodiment of the present invention, the system is further configured to, via the processor, control the at least one light source based on a predetermined time schedule. Hence, the system may control the at least one light source based on any predetermined time schedule such as e.g. the time of day. The present embodiment is advantageous in that the circadian rhythm of the animal species may be taken into consideration when influencing the animal's behavior. Furthermore, the present embodiment is advantageous in that the animals' sustenance intake behavior may be more controlled to an even further extent by the system.

According to an embodiment of the present invention, the system is further configured to, via the processor, control the at least one light source by a control of at least one of an intensity and a spectral distribution of the light emitted by the at least one light source during operation. The present embodiment is advantageous in that the system hereby may control the light source(s) such that the light source(s) may emit light with a larger variety. Hence, influencing the sustenance intake of the animal species may be more controlled by the present embodiment. For example, the system may influence the behavior of the animal species in different ways in different scenarios.

According to an embodiment of the present invention, the system is further configured to, via the processor, determine at least one of the number of animals in proximity to the at least one sustenance unit, a sustenance intake rate of the at least one animal at the at least one sustenance unit and a sustenance level of the at least one sustenance unit. The system is further configured to, via the processor, control the at least one light source based on at least one of the determined number of animals, the determined sustenance intake rate and the determined sustenance level. In other words, the system may be configured to determine the number of animals in proximity to the sustenance unit(s), a sustenance intake rate of the animal(s) at the sustenance unit(s) and/or a sustenance level of the sustenance unit(s), and the system may further be configured to, via the processor, control the light source(s) based on the determined number of animals, the determined sustenance intake rate and/or the determined sustenance level. Hence, the at least one light source may be controlled by the system based on even more information and/or factors according to features of the present embodiment, thereby allowing an even more accurate estimation of the animal behavior. The present embodiment is further advantageous in that the system may further improve the influencing of the sustenance intake of the animal species to an even larger extent.

According to an embodiment of the present invention, the system is further configured to, via the processor, reduce the intensity of the light emitted by the at least one light source during operation, if at least one of the determined number of animals exceeds a first predetermined threshold, the determined sustenance intake rate exceeds a first predetermined value and the determined sustenance level subceeds a first predetermined level, is fulfilled, or increase the intensity of the light emitted by the at least one light source during operation, if at least one of the determined number of animals subceeds a second predetermined threshold, the determined sustenance intake rate subceeds a second predetermined rate and the determined sustenance level exceeds a second predetermined level, is fulfilled. Hence, the system is further configured to, via the processor, either reduce or increase the intensity of the light emitted by the light source(s) during operation, dependent on the mentioned factors/information. The intensity of the light emitted by the light source(s) may be reduced by the system if the determined number of animals exceeds a first predetermined threshold, the determined sustenance intake rate exceeds a first predetermined value and/or the determined sustenance level subceeds a first predetermined level. Alternatively, the intensity of the light emitted by the light source(s) may be increased by the system if the intensity of the light emitted by the at least one light source during operation, if the determined number of animals subceeds a second predetermined threshold, the determined sustenance intake rate subceeds a second predetermined rate and/or the determined sustenance level exceeds a second predetermined level. The present embodiment is advantageous in that the system hereby may ameliorate the influencing and/or control of the sustenance intake of the animal species.

According to an embodiment of the present invention, the system is further configured to, via the processor, change the spectral distribution of the light emitted by the at least one light source, during operation, to a first spectral distribution, if at least one of the determined number of animals exceeds a third predetermined threshold, the determined sustenance intake rate exceeds a third predetermined rate and the determined sustenance level subceeds a third predetermined level, is fulfilled, or change the spectral distribution of the light emitted by the at least one light source, during operation to a second spectral distribution, if at least one of the determined number of animals subceeds a fourth predetermined threshold, the determined sustenance intake rate subceeds a fourth predetermined rate and the determined sustenance level exceeds a fourth predetermined level, is fulfilled, wherein the first spectral distribution is different from the second spectral distribution. Hence, the system is further configured to, via the processor, change the spectral distribution of the light emitted by the light source(s), during operation, to a first or a second spectral distribution, dependent on the mentioned factors/information. The spectral distribution is changed to a first spectral distribution if the determined number of animals exceeds a third predetermined threshold, the determined sustenance intake rate exceeds a third predetermined rate and/or the determined sustenance level subceeds a third predetermined level. Alternatively, the spectral distribution is changed to a second spectral distribution if the determined number of animals subceeds a fourth predetermined threshold, the determined sustenance intake rate subceeds a fourth predetermined rate and/or the determined sustenance level exceeds a fourth predetermined level. By the ability to change the spectral distribution of the light emitted by the light source(s) according to the present embodiment, the influencing of the sustenance intake of the animal species may be even better controlled.

According to an embodiment of the present invention, the system further comprises a control unit configured to control the at least one light source, wherein the control unit comprises the processor and is connected to the at least one sensor arrangement and the at least one light source. The present embodiment is advantageous in that the system may provide a centralized control via the control unit, e.g. allowing a user an easier access to the system.

According to an embodiment of the present invention, the control unit is wirelessly connected to the at least one sensor arrangement and the at least one light source. The present embodiment is advantageous in that sustenance units may be placed freely without needing a cable for sending and/or receiving signals. Furthermore, the risk of an animal interfering with the communication is reduced.

According to an embodiment of the second aspect of the present invention, the method further comprises the steps of detecting a movement of the at least one sustenance unit and at least one of a motion of at least one animal and a position of the at least one animal, in proximity to the at least one sustenance unit, and controlling the at least one light source based on the detected movement of the at least one sustenance unit and the determined at least one activity of the at least one animal.

According to an embodiment of the second aspect of the present invention, the method further comprises the step of controlling the at least one light source by a control of at least one of an intensity and a spectrum of the light emitted by the at least one light source during operation.

According to an embodiment of the second aspect of the present invention, the method further comprises the steps of determining at least one of the number of animals in proximity to the at least one sustenance unit, a sustenance intake rate of the at least one animal at the at least one sustenance unit and a sustenance level of the at least one sustenance unit, and wherein the method further comprises the step of controlling the at least one light source based on at least one of the determined number of animals, the determined sustenance intake rate, and the determined sustenance level.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1:
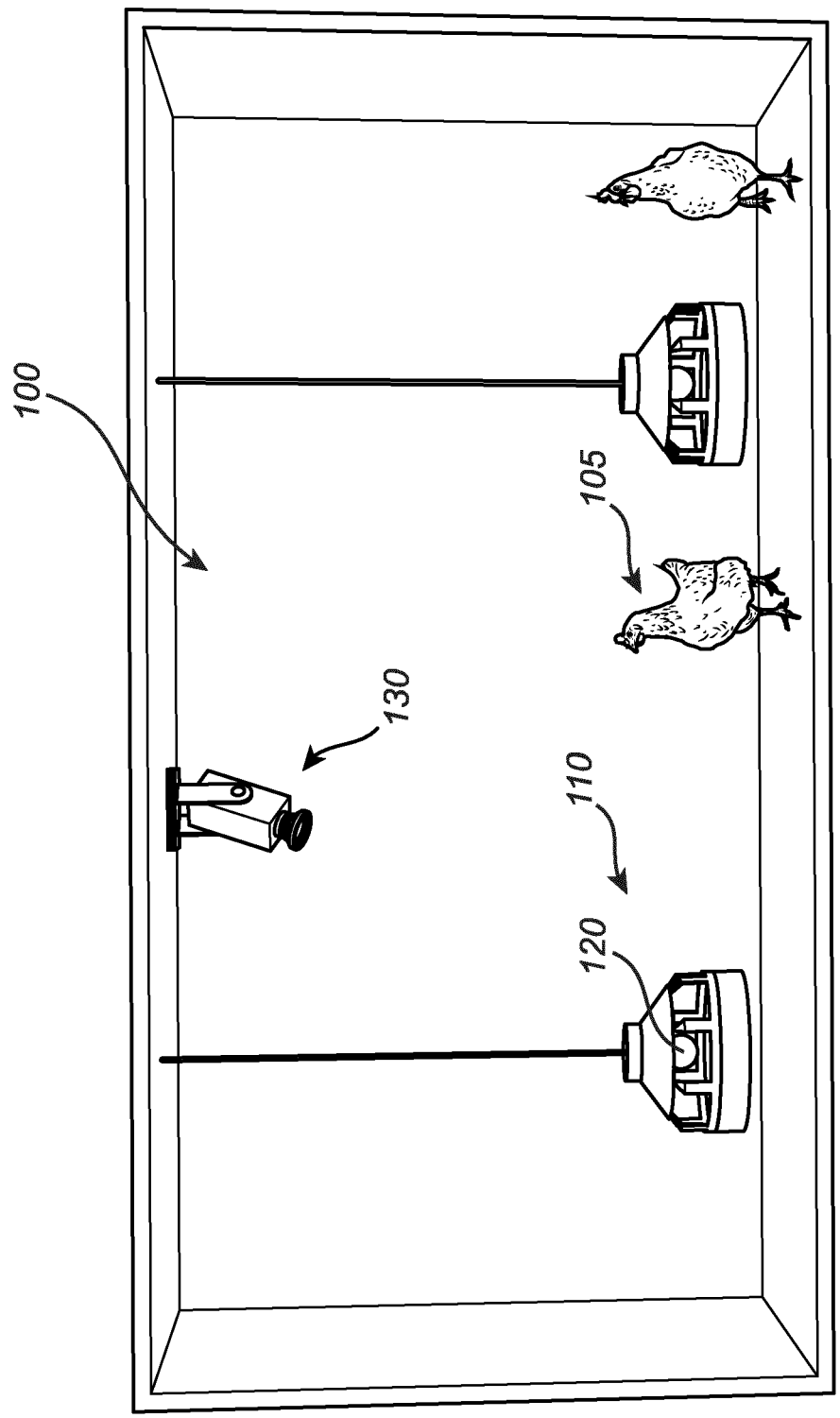
FIGS. 1-5 schematically show systems according to exemplifying embodiments of the present invention.

FIG. 1 schematically shows a system 100 for supplying sustenance to animals according to an exemplifying embodiment of the present invention. Here, the animal species 105 is exemplified as chicken, but it should be noted that the system 100 may be applied to other kinds of animal species.

The system 100 comprises at least one sustenance unit 110. Here, the sustenance unit 110 is illustrated as a cradle hanging from a cable, but it should be noted that the sustenance unit 110 may have other forms or constructions. Furthermore, the number of sustenance units 110 may be arbitrary, but for simplicity, it is referred to a single sustenance unit 110 with respect to FIG. 1. The sustenance unit 110 is configured to keep sustenance for the animal species 105, for example animal feed and water, and is configured to let an animal intake sustenance from it. The system 100 further comprises at least one light source 120. Here, the light source 120 is arranged on the sustenance unit 110. The light source 120 is configured to emit light on the sustenance unit 110 and/or the sustenance provided in the sustenance unit 110. The light source 120 may be a tunable light source, wherein the intensity, the spectral distribution and/or the periodicity of the emitted light may be tuned by the system 100.

The system 100 further comprises at least one sensor arrangement 130. The sensor arrangement 130 may comprise one or more sensors. The sensor arrangement 130 may comprise a camera-based sensor, such as a detector capable of detecting visible light, infrared light and/or ultraviolet, UV, light. For example, the system 100 may be configured to capture, via the sensor arrangement 130, at least one set of time-successive image frames, wherein each image frame of the at least one set of time-successive frame comprises the animal(s) 105, and determines a motion as a function of the captured at least one set of time-successive image frames. The sensor arrangement 130 may furthermore comprise e.g. an accelerometer, a tilt sensor and/or a gyroscope or a weight sensor, and may detect and/or monitor movements of the sustenance unit 110, such as e.g. vibrations. The sensor arrangement 130 may be in physical contact with the sustenance unit 110 and/or e.g. a cable holding the sustenance unit 110, in order to better detect e.g. the movement of the sustenance unit 110. The sensor arrangement 130 may furthermore detect e.g. short small accelerations of the sustenance unit 110 and/or detect at least one animal 105 indicating feeding of animals, wherein the detected accelerations may correlate to the number of animals 105 eating. The sensor arrangement 130 may detect accelerations of the sustenance unit 110 during relatively long periods, indicating that the sustenance unit 110 is swinging, which may indicate overcrowding near the sustenance unit 110. The sensor arrangement 130 may furthermore monitor contact-based activity of the animals 105 by comprising touch sensors. The sensor arrangement 130 may monitor proximity-based activity of the animals 105 by comprising radar, lidar or capacitive sensors. The sensor arrangement 130 may monitor audio-based activity by comprising e.g. a microphone. The sensor arrangement 130 is primarily configured to detect the movement, motion, position and/or sound of the animal 105 in proximity to the sustenance unit 110, e.g. when the distance between the animal 105 and the sustenance unit 110 is below a predetermined threshold value. This distance may vary depending on many different factors, such as the design of the stables in which the animal species resides and/or the specifics of the system 100. The predetermined threshold value for this distance may depend on the size of the space in which the animal species is free to roam and/or on a distance between the animal 105 and its closest sustenance unit 110 and the distance between the multiple sustenance units. The sensor arrangement 130 may be arranged on the sustenance unit 110 or anywhere in the space in which the animals reside. It is to be understood that the sensors comprised in the sensor arrangement 130 may be arranged at different places in the space in which the animals 105 reside. For example, the sensor arrangement 130 may comprise a camera/image detector arranged in the roof of a stable, for monitoring the position and movement of the animals, and an accelerometer arranged on the sustenance unit 110, for detecting any movement of the sustenance unit 110.

The sensor arrangement 130 is configured to detect a movement of the sustenance unit 110, a position of the animal(s) 105, a motion of the animal(s) 105 and a sound of the animal(s). The movement of the sustenance unit 110 detected by the sensor arrangement 130 may be caused by e.g. touching, shaking and/or displacement (in relation to a default position) of the sustenance unit 110 by the animal(s) 105. The sound of the animal(s) 105 detected by the sensor arrangement 130 may be animal sounds and/or sounds caused by the animal(s) 105 when interacting with the sustenance unit 110, another animal and/or the surface on which it walks, such as the stable floor. The detected position, motion, and/or sound of the animal(s) 105 may have occurred in close proximity to the sustenance unit 110. Furthermore, a detected difference in volume in the detected sound by the sensor arrangement 130 may provide information on the number of animals 105 and their activity(ies). Furthermore, if a plurality of different sounds is detected, the respective volume and/or frequency of the different sounds may be detected by the sensor arrangement 130, which may provide the system 100 with information on the number of animals 105 making the respective sound and/or are in audio-range of the sensor. For example, the detected sound may provide information on the sustenance intake rate at the sustenance unit 110. It is to be understood that the sensor arrangement 130 does not have to be arranged on the sustenance unit 110 to detect a motion, position and/or sound of the at least one animal 105 in proximity to the sustenance unit 110. For example, the sensor arrangement 130 may be arranged externally to the sustenance unit 110, e.g. in a roof of the space in which the animal(s) reside(s).

The system 100 further comprises a processor coupled to the sensor arrangement 130. The processor is configured to compare a detected motion of at least one animal 105 with at least one predetermined motion associated with at least one activity of the animal(s) 105. It should be noted that the system 100 may perform the comparison based on image analysis, e.g. comprising pattern recognition. The system 100 may perform the comparison e.g. by using a neural network which has been trained with the predetermined motion(s) associated with animal movement and/or images. The sensor arrangement 130 may, for example, detect a pecking motion and/or sound by the animal(s) 105, and the processor may associate that motion with the activity that the animal 105 eats from the sustenance unit 110. Furthermore, the processor may be configured to compare the detected sound with a predetermined sound associated with at least one activity of the at least one animal 105. The system 100 may hereby determine at least one activity of the at least one animal 105 based on the detected position of the animal(s) 105, the comparison of the detected motion with the predetermined motion(s) and/or the comparison of the detected sound with the predetermined sound(s).

The processor is further configured to determine at least one activity of the at least one animal 105 based on the detected position of the animal 105, the comparison of the detected motion with the at least one predetermined motion and/or the detected sound of the animal 105. The activity(ies) of the animal(s) 105 may be eating from a specific sustenance unit 110, crowding the sustenance unit 110, standing still or moving at a certain position which is distal from the sustenance unit 110, sleeping, etc.

The system 100 may, via the processor, control the light source(s) 120 based on the detected movement of the sustenance unit 110, and/or the determined activity(ies) of the animal(s) 105. The system 100 is configured to control the light source 120 in such a way that the light emitted from the light source(s) 120 influences the behavior of the animal(s) 105. For example, the light source 120 may be signaled to emit a light which is known to motivate the animal 105 to eat from the sustenance unit 110. The system 100 may also control the light source 120 in order to motivate the animal 105 to eat from a specific sustenance unit 110 away from its present location, in order to e.g. reduce overcrowding, create a more uniform distribution of animals 105 at the sustenance unit 110, etc. In other words, the system may be configured to motivate animals 105 to leave an overcrowded sustenance unit 110, by turning off the light source 120 that emits light on the overcrowded sustenance unit 110 or by emitting a light on the overcrowded sustenance unit 110, which is known to deter animals 105 from going there, and/or by emitting a light on a different sustenance unit 110, which is known to motivate animals 105 to go there. The system's 100 ability to reduce overcrowding may result in both better growth of the animals 105 and improve their wellbeing.

The system 100 is further configured to, via the processor, determine the number of animal(s) 105 in proximity to the sustenance unit 110, a sustenance intake rate of the animal(s) 105 at the sustenance unit 110 and/or a sustenance level of the sustenance unit 110. The system 100 is further configured to, via the processor, control the light source 120 based on the determined number of animals, the determined sustenance intake rate and/or the determined sustenance level. It is to be understood that the sensor arrangement 130 may directly detect a sustenance level in the sustenance unit 110, e.g. by using optical range sensors, a lidar and/or a radar.

The system 100 may further be configured to emit light on the sustenance unit 110 with different intensities depending on whether or not one or more predetermined condition(s) are fulfilled. The predetermined condition may be at least one of the determined number of animals exceeds a first predetermined threshold, the determined sustenance intake rate exceeds a first predetermined rate, the determined sustenance level subceeds a first predetermined level, the determined number of animals 105 subceeds a second predetermined threshold, the determined sustenance intake rate subceeds a second predetermined rate, and the determined sustenance level exceeds a second predetermined level. The first predetermined threshold is higher than the second predetermined threshold, and the first predetermined rate is higher than the second predetermined rate. The first predetermined level is lower than the second predetermined level.

The system 100 may further be configured to emit light on the sustenance unit 110 with different spectral distributions depending on whether or not one or more predetermined conditions are fulfilled. The predetermined conditions may be at least one of the determined number of animals 105 exceeds a third predetermined threshold, the determined sustenance intake rate exceeds a third predetermined rate, the determined sustenance level subceeds a third predetermined level, the determined number of animals 105 subceeds a fourth predetermined threshold, the determined sustenance intake rate subceeds a fourth predetermined rate, and the determined sustenance level exceeds a fourth predetermined level. The third predetermined threshold is higher than the fourth predetermined threshold, and the third predetermined rate is higher than the fourth predetermined rate. The third predetermined level is lower than the fourth predetermined level.

The system 100 may further be configured to emit light on the sustenance unit 110 with a different spectral distribution and/or intensity based on a time schedule. For example, the time of day may be taken into account by the system 100 when controlling the light emitted by the light source 120 and/or the time since the animals' 105 last feeding. Accordingly, there may be a periodicity in the light emitted by the light source 120. Accordingly, the system 100 may use periodic lighting schedules for improving growth and wellbeing of the animals 105. Furthermore, the system 100 may be configured to detect a motion of an animal 105 waking up during the night, and determine that the animal 105 is awake and looking for sustenance. Furthermore, the system 100 may be configured to increase the intensity of the light emitted by the light source 120 in order to direct an animal 105 towards the closest sustenance unit 110.

The system 100 may further be configured to reduce the intensity of the light emitted or change the spectral distribution of the light emitted to a first spectral distribution on the at least one sustenance unit 110, if e.g. the sustenance unit 110 has relatively many animals 105 at it, if the animals 105 are eating too fast or if the sustenance level is relatively low. The system 100 may further be configured to increase the intensity of the light emitted or change the spectral distribution of the light emitted to a second spectral distribution on the sustenance unit 110, if e.g. the sustenance unit 110 has relatively few animals 105 in its vicinity, if the animals 105 are not eating fast enough and/or if the sustenance level of the sustenance unit 110 is relatively high.

The spectral distribution of the light emitted by the light source 120 may be changed to a first spectral distribution to make the sustenance less visible and/or less attractive to the animals 105. For example, the light source 120 may emit light with a spectral distribution such that when combined with the light being reflected on the sustenance in the sustenance unit 100, the sustenance unit 110 and/or the sustenance is made less visible and/or less attractive to the animal species. For example, if the feed is substantially yellow, the light emitted by the light source 120 may be substantially purple, which results in the sustenance looking grey to the animal species.

The spectral distribution of the light emitted by the light source 120 may alternatively be changed to a second spectral distribution to make the sustenance and/or sustenance unit 110 more visible and/or more attractive to the animals 105. In order to make the sustenance and/or sustenance unit 110 more visible and/or more attractive, light may be emitted by the light source 120 with a spectral distribution which changes periodically at certain frequencies. Thereby, a sparkling effect may be achieved, making the sustenance and/or the sustenance unit 110 shine/sparkle, which may make the animals 105 interested in the sustenance and/or sustenance unit 110. For example, when an animal 105 is obstructing other animals 105 from reaching the sustenance unit 110, the light emitted by the light source 120 may flicker or pulse in order to make an animal 105 that is not feeding to move away from the sustenance unit 110, thus allowing other animals 105 to intake sustenance from the sustenance unit 110.

Figure 2:
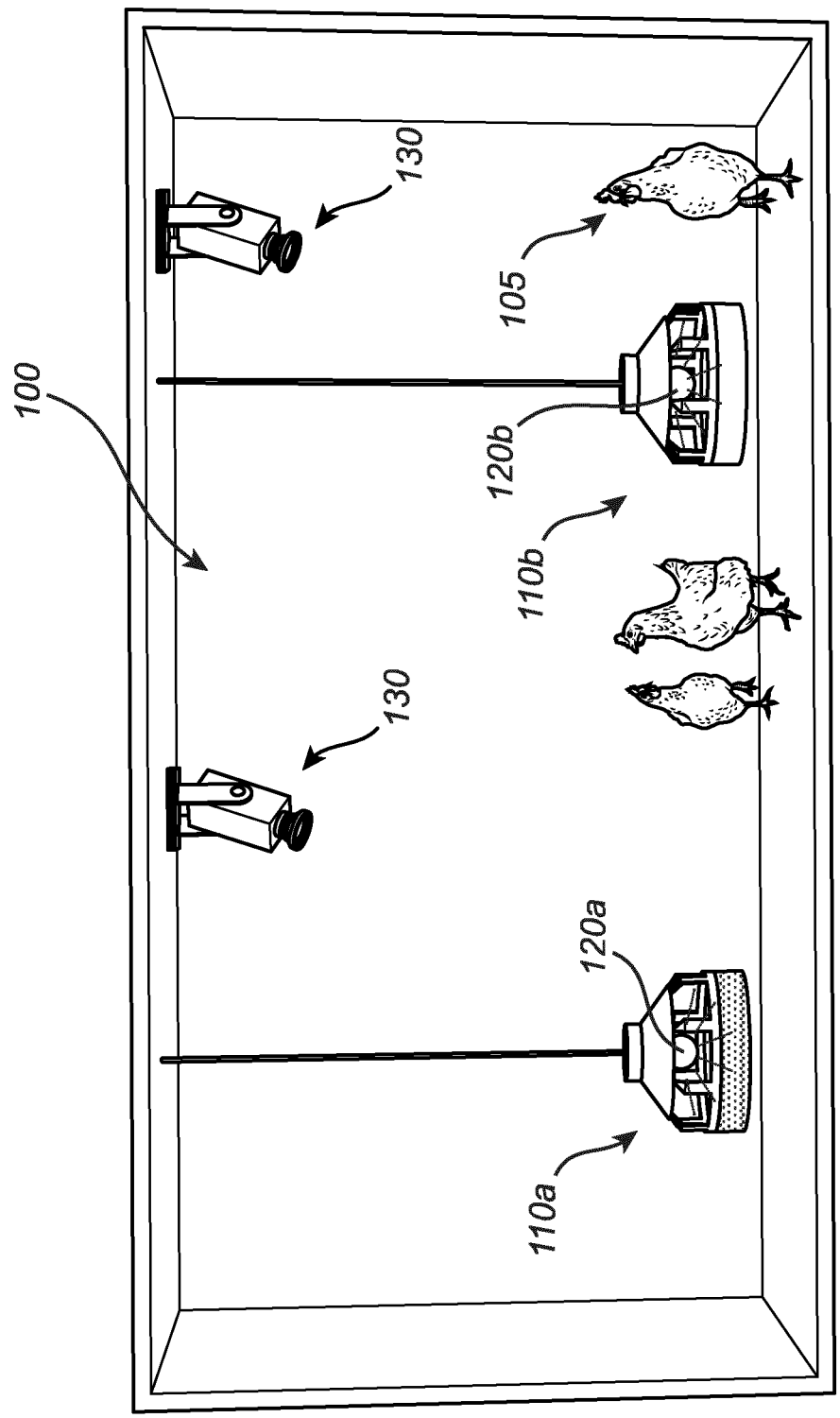

FIG. 2 schematically illustrates a system 100 which is similar to the system 100 in FIG. 1. As many features of the configuration and operation of the system 100 is substantially similar to that described in FIG. 1, a detailed description of features common to the embodiment illustrated in FIG. 1 has been omitted for the sake of brevity and conciseness. Furthermore, the number of sustenance units 110 may be arbitrary, but for simplicity, it is referred to two sustenance units 110a, 110b with respect to FIG. 1.

In FIG. 2, a first light source 120a may emit light that attracts animals 105 to the first sustenance unit 110a, if the first sustenance unit 110a has a sustenance level which exceeds a predetermined level. Furthermore, a second light source 120b may emit light that deters animals 105 from going to a second sustenance unit 110b, if the second sustenance unit 110b has a sustenance level which subceeds a predetermined level. The system 100 may also control the light source 120 to deter animals 105 from going to an empty and/or dysfunctional sustenance unit 110, and motivate at least one animal 105 to go to a sustenance unit 110 which has sustenance and/or which functions properly.

Figure 3:
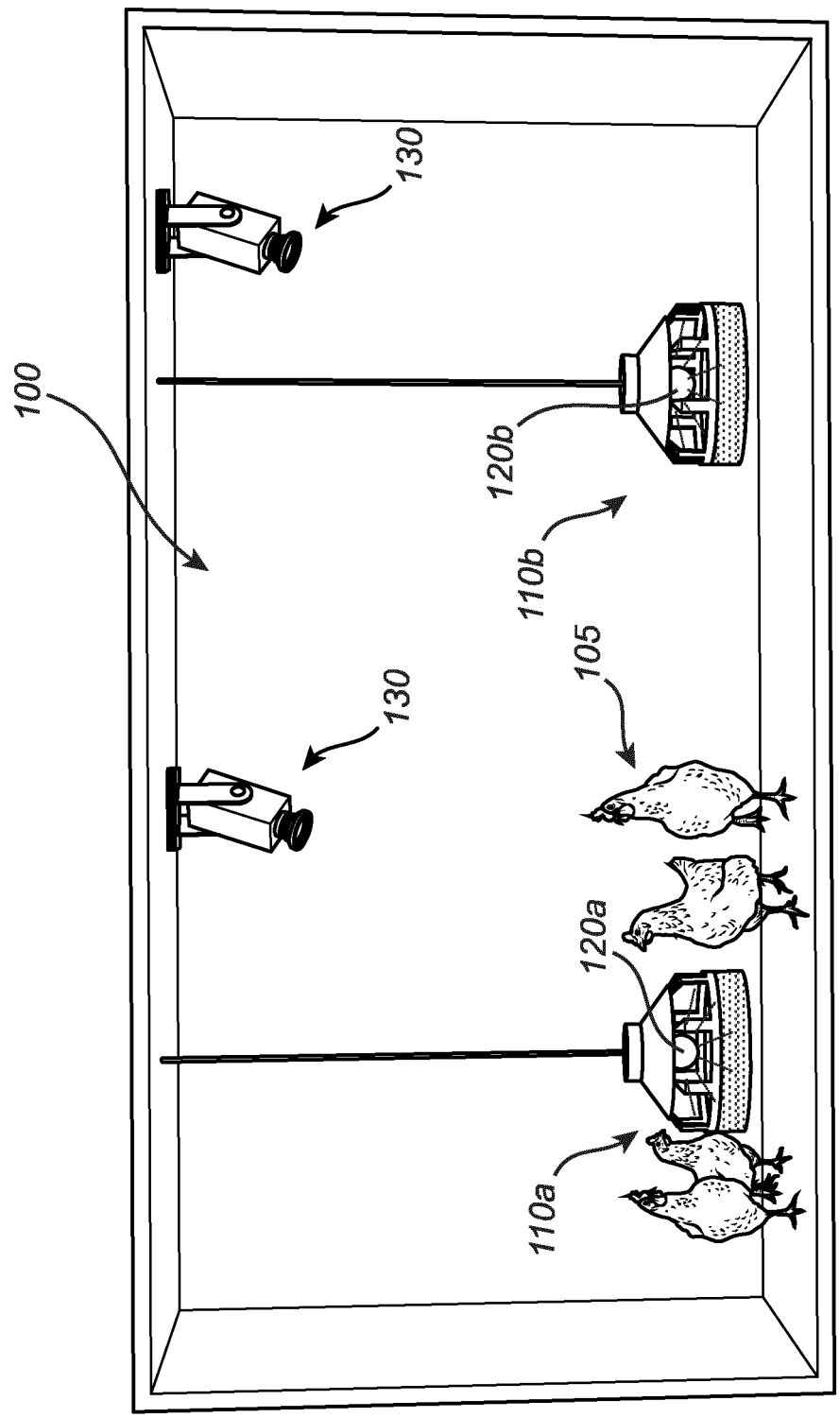

FIG. 3 schematically illustrates a system 100 which is similar to the system 100 in FIG. 1. As many features of the configuration and operation of the system 100 is substantially similar to that described in FIG. 1, a detailed description of features common to the embodiment illustrated in FIG. 1 has been omitted for the sake of brevity and conciseness. In FIG. 3, a first light source 120*a* may emit light that deters animals 105 from going to a first sustenance unit 110*a*, if the first sustenance unit 110*a* is overcrowded, with a number of animals 105 exceeding a predetermined threshold, and/or if the animals 105 taking in sustenance at the first sustenance unit 110*a* have a combined intake rate exceeding a predetermined rate.

Furthermore, a second light source 120*b* may emit light that attracts animals 105 to a second sustenance unit 110*b*, if the number of animals that is around or taking in sustenance from the second sustenance unit 110*b* is subceeding a predetermined threshold, and/or if the sustenance level at the second sustenance unit 110*b* exceeds a predetermined level.

It is to be understood that the system 100 is configured to change the intensity and the spectral distribution of the light emitted by the at least one light source 120 in any combination, and with any periodicity, based on a detected movement of the sustenance unit 110, a determined activity(ies) of the animal(s) 105, a determined number of animals 105, a determined sustenance intake rate and/or a determined sustenance level. The system 100 may hereby influence the sustenance intake of the animals 105 to improve growth and wellbeing of the animals.

Figure 4:
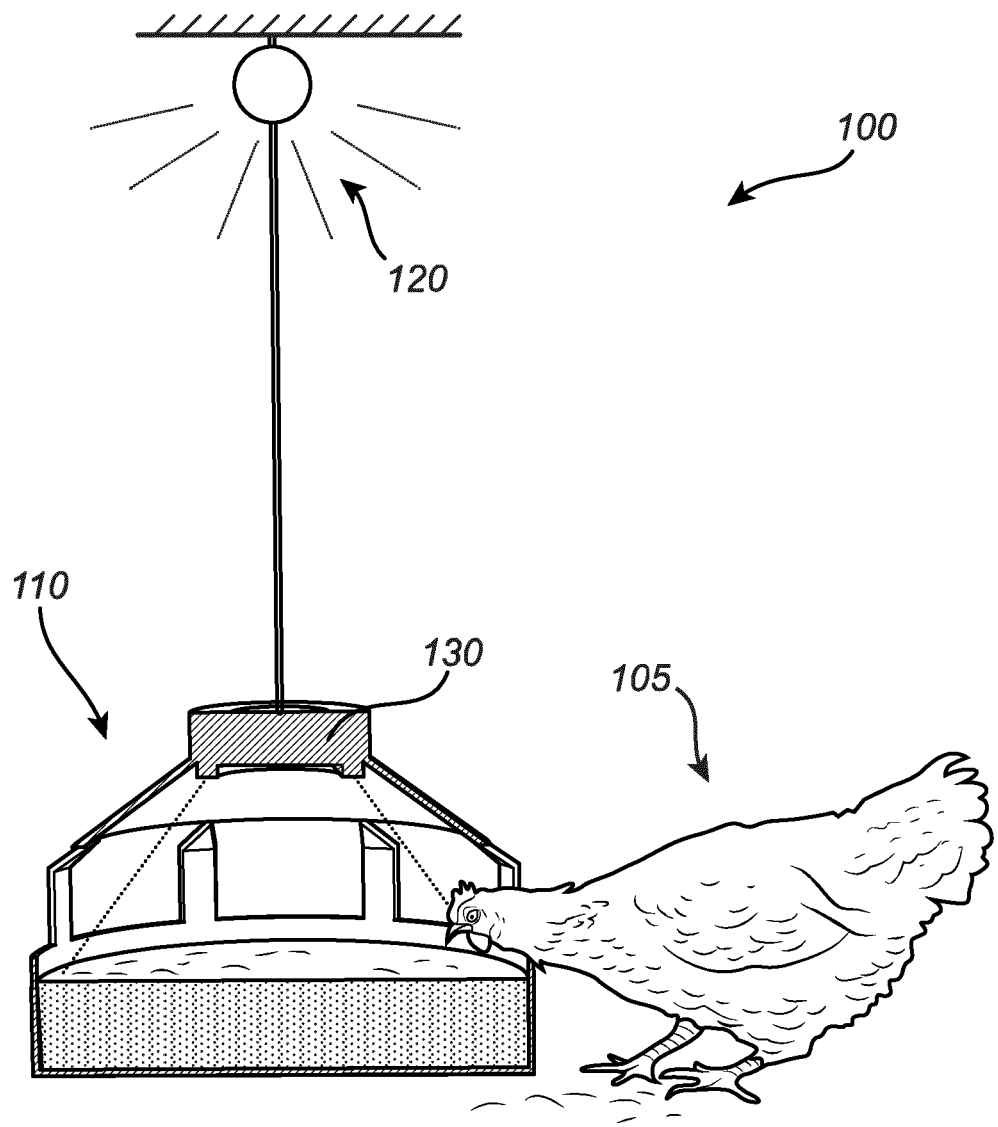

FIG. 4 schematically shows a system 100 according to an exemplifying embodiment of the present invention. The system 100 in FIG. 4, comprises a sustenance unit 110, although it should be noted that there may be an arbitrary number of sustenance units 110. The system 100 further comprises a light source 120. The system further comprises a sensor arrangement 130. The sensor arrangement 130 may be an optical range sensor arranged on the sustenance unit 110. It is to be understood that the sensor arrangement 130 may comprise any sensor mentioned in any of the previously described embodiments. The sensor arrangement 130 may detect a sustenance level of the sustenance in the sustenance unit 110. The sustenance may be animal feed. Furthermore, the sensor arrangement 130 may detect a position, motion and/or sound of the animal(s) 105, if the animal 105 is feeding from the sustenance unit 110 or is in (close) proximity to the sustenance unit 110. For example, a pecking motion or sound may be detected by the system 100 when the animal picks for sustenance. The system 100 further comprises a processor. The processor may be configured to compare the detected motion with at least one predetermined motion associated with at least one activity of the animal(s) 105. Further, the processor may be configured to determine one or more activities of the animal(s) 105 based on the detected position of the animal(s) 105, the comparison of the detected motion with the at least one predetermined motion, and/or the detected sound of the animal(s) 105.

The system 100 is further configured to, via the processor, based on the detected movement of the sustenance unit 110, the detected position of the animal(s) 105, the detected movement of the animal(s) 105 and/or the detected sound of the animal(s) 105, determine the number of animals present (i.e. in a vicinity of) the sustenance unit 110, the sustenance intake rate of the animal(s) 105 at the sustenance unit(s) 110 and/or the sustenance level of the sustenance unit 110.

The system 100 is further configured to control the light source 120 based on the detected movement of the sustenance unit 110, the determined activity(ies) of the animal 105, the determined number of animals 105, the determined sustenance intake rate of the animal(s) 105 and/or the determined sustenance level.

Figure 5:
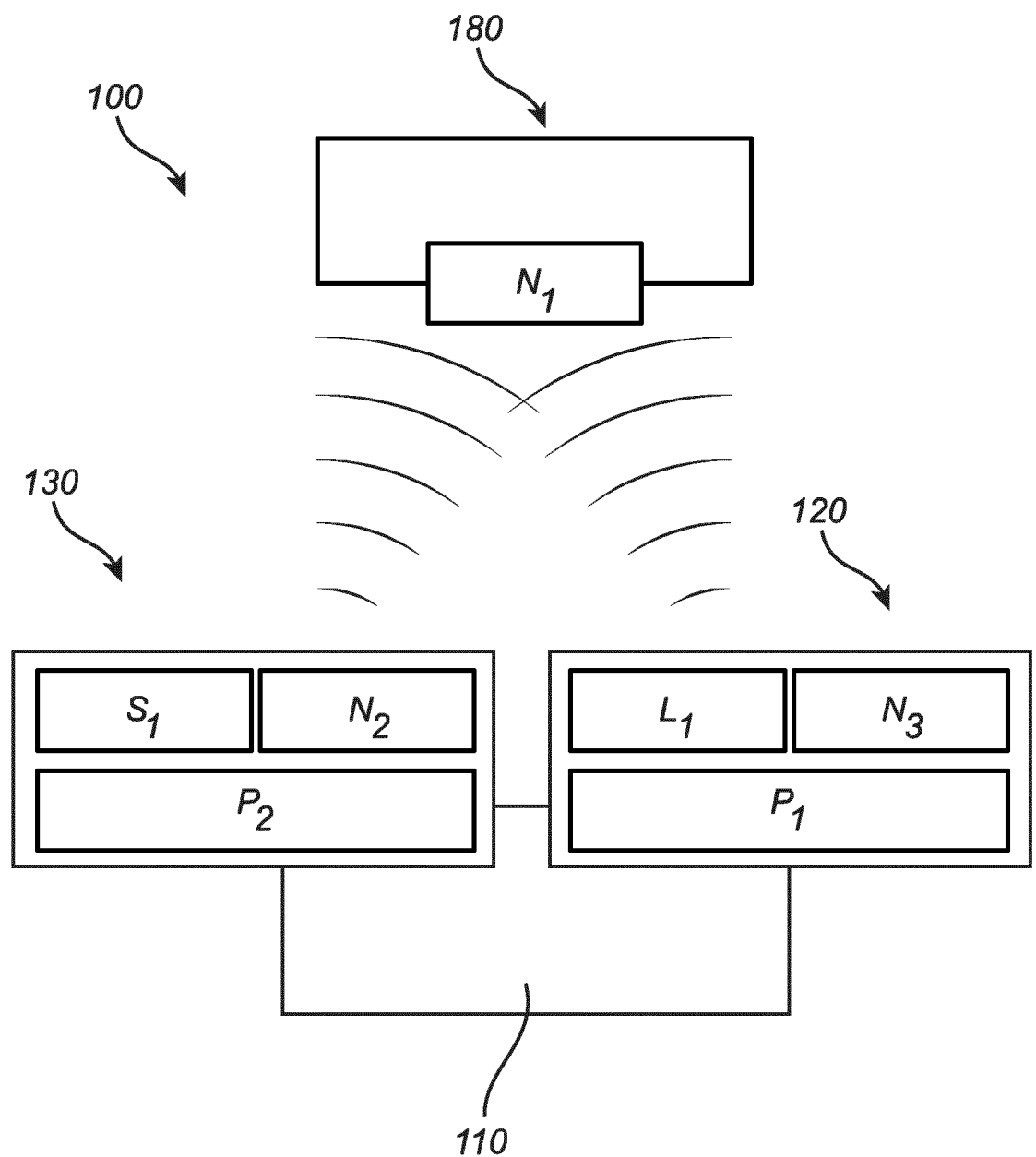

FIG. 5 schematically shows a system 100 according to an exemplifying embodiment of the present invention. The system 100 in FIG. 5 comprises a sustenance unit 110 and a control unit 180. The control unit 180 may comprise a processor. The system 100 further comprises a light source 120 connected to the control unit 180. The light source 120 may comprise a light emitting diode, LED, $L_1$. The light source 120 may be powered by a wired power unit, $P_1$, such as an electrical cable. The system 100 further comprises a sensor arrangement 130 connected to the control unit 180. The sensor arrangement 130 comprises at least one sensor, $S_1$. The sensor arrangement 130 may be powered by a battery, $P_2$.

In FIG. 5, the light source 120, the sensor arrangement 130 and the control unit 180 may comprise a respective network module, $N_1$, $N_2$, $N_3$, such as a transceiver capable of sending and receiving signals. The sensor arrangement 130 may detect the position of at least one animal in proximity to the sustenance unit 110, a motion of at least one animal in proximity to the sustenance unit 110, a sound of at least one animal in proximity to the sustenance unit 110, a movement of the sustenance unit 110 and/or a sustenance level of the sustenance unit 110. The sensor arrangement 130 may send a signal, by e.g. using the network module, $N_2$, to the control unit 180 indicating a detected movement of the sustenance unit 110, a detected position of at least one animal 105, a detected motion of the animal(s) 105, a detected sound of the animal(s) 105 and/or a sustenance level of the sustenance unit 110. The control unit 180 may compare the detected motion with at least one predetermined motion associated with at least one activity of the at least one animal 105. Further, the control unit 180 may determine (an) activity(ies) of the animal(s) 105 based on the position of the animal(s) 105, the comparison of the detected motion with the at least one predetermined motion and/or the detected sound of the animal(s) 105. The control unit 180 may further determine the number of animals 105 in proximity to the sustenance unit(s) 110, a sustenance intake rate of the animal(s) 105 at the sustenance unit(s) 110 and a sustenance level of the sustenance unit 110.

The control unit 180 may control the light source(s) 120 based on the detected movement of the sustenance unit 110, the determined activity(ies) of the animal(s) 105, the determined number of animals 105, the determined sustenance intake rate and/or the determined sustenance level. The control unit 180 may communicate with the light source(s) 120 by sending a signal, by e.g. using the network module, $N_1$, indicating the light source(s) 120 to emit light with a certain intensity and/or spectral distribution. The light source 120 may receive this signal, by e.g. using the network module, $N_3$. The control unit 180 may signal the light source 120 to turn the light source 120 on or off. The control unit 180 may signal the light source 120 to change intensity and/or spectral distribution, e.g. when certain activities of the animal(s) have been determined or when predetermined conditions have been fulfilled. The predetermined conditions may be related to the determined number of animals 105, the determined sustenance intake rate and the determined sustenance level.

The control unit 180, the light source(s) 120 and the sensor arrangement(s) 130 may be connected wirelessly or via a cable.

It is to be understood that the system 100 may be configured detect the movement of multiple sustenance units 100, the positions of substantially all the animals 105, the motions of substantially all the animals 105 and/or the sounds of substantially all the animals 105 present in e.g. a stable. Further, the system 100 may be configured to determine an activity of substantially all the animals 105. In other words, the system 100 may map the status of all sustenance units 110 and the activity(ies) of the animals 105. The system 100 may use this information separately or in combination, in order to control the light sources 120 to improve the sustenance intake rate behavior and general wellbeing of the animals 105. Thus, the system 100 may allow the behavior of the animals 105, e.g. an entire flock in a stable, to be analyzed on a stable/flock level, to control the light source 120 in a manner which optimizes the behavior of the animals 105 in regard to sustenance intake and wellbeing. That is, by knowing what substantially all the animals 105 in the stable are doing, the system 100 allows for an improved influencing of the sustenance intake behavior of the flock.

The person skilled in the art realizes that the present invention by no means is limited to the preferred embodiments described above. On the contrary, many modifications and variations are possible within the scope of the appended claims.

The invention claimed is:

1. A system for supplying sustenance to animals, comprising:
   at least one sustenance unit arranged to contain animal sustenance,
   at least one light source configured to illuminate the at least one sustenance unit,
   at least one sensor arrangement configured to detect:
      a movement of the at least one sustenance unit, and to detect at least one of:
      a position of at least one animal in proximity to the at least one sustenance unit,
      a motion of at least one animal in proximity to the at least one sustenance unit, and
      a sound of at least one animal in proximity to the at least one sustenance unit, and
   a processor coupled to the at least one sensor arrangement, wherein the processor is configured to:
      compare the detected motion with at least one predetermined motion associated with at least one activity of the at least one animal, and
      determine at least one activity of the at least one animal based on at least one of the detected position of the at least one animal, the comparison of the detected motion with the at least one predetermined motion, and the detected sound of the at least one animal,
   wherein the system is configured to, via the processor, control the at least one light source based on:
   the detected movement of the at least one sustenance unit, and
   the determined at least one activity of the at least one animal.

2. The system according to claim 1, wherein the at least one sensor arrangement is configured to detect a movement of the at least one sustenance unit and a motion of at least one animal, and wherein the system is configured to, via the processor, control the at least one light source based on the detected movement of the at least one sustenance unit and the determined at least one activity of the at least one animal.

3. The system according to claim 1, wherein the at least one sensor arrangement is integrated in the at least one sustenance unit.

4. The system according to claim 1, wherein the at least one sensor arrangement comprises at least one of a camera, an accelerometer, a tilt sensor, a gyroscope, a weight sensor, a touch sensor, a radar, a lidar sensor, a capacitive sensor, an inductive sensor, a temperature sensor, a thermopile sensor and an audio sensor.

5. The system according to claim 1, wherein the system is configured to, via the processor, control the at least one light source based on a predetermined time schedule.

6. The system according to claim 1, wherein the system is further configured to, via the processor,
   control the at least one light source by a control of at least one of an intensity and a spectral distribution of the light emitted by the at least one light source during operation.

7. The system according to claim 6, wherein the system is further configured to, via the processor, determine at least one of:
   the number of animals in proximity to the at least one sustenance unit,
   a sustenance intake rate of the at least one animal at the at least one sustenance unit, and
   a sustenance level of the at least one sustenance unit,
   and wherein the system is further configured to, via the processor,
   control the at least one light source based on at least one of
   the determined number of animals,
   the determined sustenance intake rate, and
   the determined sustenance level.

8. The system according to claim 7, wherein the system is further configured to, via the processor, reduce the intensity of the light emitted by the at least one light source during operation, if at least one of:
   the determined number of animals exceeds a first predetermined threshold,
   the determined sustenance intake rate exceeds a first predetermined value, and
   the determined sustenance level subceeds a first predetermined level, is fulfilled, or
   increase the intensity of the light emitted by the at least one light source during operation, if at least one of:
   the determined number of animals subceeds a second predetermined threshold,
   the determined sustenance intake rate subceeds a second predetermined rate, and
   the determined sustenance level exceeds a second predetermined level, is fulfilled.

9. The system according to claim 7, wherein the system is further configured to, via the processor,
   change the spectral distribution of the light emitted by the at least one light source, during operation, to a first spectral distribution, if at least one of:
   the determined number of animals exceeds a third predetermined threshold,
   the determined sustenance intake rate exceeds a third predetermined rate, and
   the determined sustenance level subceeds a third predetermined level, is fulfilled, or
   change the spectrum of the light emitted by the at least one light source, during operation to a second spectral distribution, if at least one of:

the determined number of animals subceeds a fourth predetermined threshold, the determined sustenance intake rate subceeds a fourth predetermined rate, and the determined sustenance level exceeds a fourth predetermined level, is fulfilled, wherein the first spectral distribution is different from the second spectral distribution.

10. The system according to claim 1, wherein the system further comprises a control unit configured to control the at least one light source, wherein the control unit comprises the processor and is connected to the at least one sensor arrangement and the at least one light source.

11. The system according to claim 10, wherein the control unit is wirelessly connected to the at least one sensor arrangement and the at least one light source.

12. A method for supplying sustenance to animals, wherein the method comprises the steps of:
    detecting a movement of at least one sustenance unit, and detecting at least one of:
        a position of at least one animal in proximity to the at least one sustenance unit,
        a motion of at least one animal in proximity to the at least one sustenance unit, and
        a sound of at least one animal in proximity to the at least one sustenance unit,
    comparing the detected motion with at least one predetermined motion associated with at least one activity of the at least one animal,
    determining at least one activity of the at least one animal based on at least one of the detected position of the at least one animal, the comparison of the detected motion with the at least one predetermined motion, and the detected sound of the at least one animal,
    controlling at least one light source configured to illuminate the at least one sustenance unit based on the detected movement of the at least one sustenance unit and the determined at least one activity of the at least one animal.

13. The method according to claim 12, wherein the method further comprises the steps of:
    detecting a movement of the at least one sustenance unit and at least one of a motion of at least one animal and a position of the at least one animal, in proximity to the at least one sustenance unit, and
    controlling the at least one light source based on the detected movement of the at least one sustenance unit and the determined at least one activity of the at least one animal.

14. The method according to claim 12, wherein the method further comprises the step of:
    controlling the at least one light source by a control of at least one of an intensity and a spectrum of the light emitted by the at least one light source during operation.

15. The method according to claim 12, wherein the method further comprises the steps of:
    determining at least one of:
        the number of animals in proximity to the at least one sustenance unit,
        a sustenance intake rate of the at least one animal at the at least one sustenance unit, and
        a sustenance level of the at least one sustenance unit,
    and wherein the method further comprises the step of:
        controlling the at least one light source based on at least one of:
            the determined number of animals,
            the determined sustenance intake rate, and
            the determined sustenance level.

* * * * *